(12) United States Patent
Lee et al.

(10) Patent No.: US 11,738,271 B2
(45) Date of Patent: Aug. 29, 2023

(54) METHOD AND APPARATUS FOR PREDICTING GAME DIFFICULTY BY USING DEEP-LEARNING BASED GAME PLAY SERVER

(71) Applicant: NHN CLOUD CORPORATION, Gyeonggi-do (KR)

(72) Inventors: Chang Yul Lee, Gyeonggi-do (KR); Jun Yeop Lee, Gyeonggi-do (KR); Choong Hyun Kim, Gyeonggi-do (KR)

(73) Assignee: NHN CLOUD CORPORATION, Gyeonggi-Do (KR)

( * ) Notice: Subject to any disclaimer, the term of this patent is extended or adjusted under 35 U.S.C. 154(b) by 270 days.

(21) Appl. No.: 17/105,508

(22) Filed: Nov. 26, 2020

(65) Prior Publication Data
US 2021/0245056 A1 Aug. 12, 2021

(30) Foreign Application Priority Data

Feb. 6, 2020 (KR) ........................ 10-2020-0014213

(51) Int. Cl.
*A63F 13/67* (2014.01)
*A63F 13/79* (2014.01)
(Continued)

(52) U.S. Cl.
CPC .............. *A63F 13/67* (2014.09); *A63F 13/44* (2014.09); *A63F 13/822* (2014.09); *G06N 3/08* (2013.01); *A63F 2300/6009* (2013.01)

(58) Field of Classification Search
CPC ........ A63F 13/352; A63F 13/44; A63F 13/67; A63F 13/798; A63F 13/822;
(Continued)

(56) References Cited

U.S. PATENT DOCUMENTS

| 2018/0243656 | A1* | 8/2018 | Aghdaie | ................. A63F 13/67 |
| 2019/0381407 | A1* | 12/2019 | Aghdaie | ............... A63F 13/537 |
| 2020/0078685 | A1 | 3/2020 | Aghdaie et al. | |

FOREIGN PATENT DOCUMENTS

| JP | 2019-28839 | 2/2019 |
| JP | 2019-191786 | 10/2019 |

(Continued)

OTHER PUBLICATIONS

Notice of Allowance dated Jun. 1, 2021 for Korean Patent Application No. 10-2020-0014213 and its English Translation from Global Dossier.
(Continued)

*Primary Examiner* — Lawrence S Galka
(74) *Attorney, Agent, or Firm* — Ladas & Parry, LLP

(57) ABSTRACT

A method and apparatus for predicting game difficulty by using a deep-learning based game play server predict a difficulty of stage maps of a match puzzle game using a deep-learning based game play server that performs the match puzzle game and modify the stage maps. The deep-learning based game play server includes: a communicator configured to receive first stage maps of a first size and second stage maps of a second size; memory configured to store an agent model; at least one processor configured to perform learning of the agent model and perform the match puzzle game using the learned agent model.

19 Claims, 11 Drawing Sheets

(51) Int. Cl.
  *A63F 13/44* (2014.01)
  *A63F 13/822* (2014.01)
  *G06N 3/08* (2023.01)

(58) Field of Classification Search
  CPC ............ A63F 2300/6009; G06N 3/006; G06N 3/0454; G06N 3/08
  See application file for complete search history.

(56) References Cited

FOREIGN PATENT DOCUMENTS

| KR | 10-2007-0033177 | 3/2007 |
|----|-----------------|--------|
| KR | 10-2018-0001610 | 1/2018 |
| KR | 10-2018-0099532 | 9/2018 |
| KR | 10-2030942      | 10/2019 |

OTHER PUBLICATIONS

Notice of Allowance dated Apr. 12, 2022 for Japanese Patent Application No. 2020-196293 and its English Translation from Global Dossier.

Tsujimoto Takaaki: "The formation of strengthening learning efficiency in a turn system command battle", Information Processing Society of Japan report of research Game information study (GI). 2019-GI-42, Japan, Information Processing Society of Japan, Jul. 12, 2019, pp. 1-2.

Office Action dated Nov. 30, 2021 for Japanese Patent Application No. 2020-196293 and its English Translation from Global Dossier.

* cited by examiner

METHOD AND APPARATUS FOR PREDICTING GAME DIFFICULTY BY USING DEEP-LEARNING BASED GAME PLAY SERVER

CROSS REFERENCE TO RELATED APPLICATION

This application claims priority from and benefits of Korean Patent Application No. 10-2020-0014213, filed on Feb. 6, 2020, which is hereby incorporated by reference for all purposes as if fully set forth herein.

BACKGROUND OF THE DISCLOSURE

Technical Field

The present disclosure generally relates to a method and apparatus for predicting game difficulty by using a deep-learning based game play server, and more particularly, to a method and apparatus for predicting game difficulty by using a deep-learning based game play server for predicting a difficulty of a stage map of a game using a deep-learning based game play server that performs the game and modifying the stage map of the game.

Related Art

With the development of information communication technology and terminal specifications, a portable device such as a smart phone, a Personal Data Assistant (PDA), Portable Multimedia Player (PMP), or the like has been evolving to a total entertainment device gradually, and a necessity for contemporary modern people.

Recently, a high performance mobile terminal such as a smart phone has been rapidly supplied, which is mounted with a high performance processor and a large capacity of memory like a personal computer (PC), for which a user may install applications freely to use it.

Such a mobile terminal may be used for multiple uses such as document management, playing of a music file or a video file, execution of a game, scheduling, photographing and management of a picture and a video.

Particularly, as increase of users enjoying a game using a terminal device during a boring time such as a travel time or a waiting time as well as a leisure time, various types of games have been provided such as a PC game of which program is installed and executed on a PC, a mobile game simply enjoyable through a mobile terminal like a mobile phone, a web game not restricted by a terminal specification since the game is enjoyable through a web browser, of which game program is not installed, and so on. Recently, a demand for a puzzle game easily enjoyable during a short time is increased.

However, for a puzzle game, a difficulty of the game is determined depending on a state of stage map, and a new stage map is provided in accordance with a game difficulty for users after a game difficulty is separately evaluated for a new game map. In order to evaluate the game difficulty for a new stage map accurately, actual game plays should be done more than dozens of times to a few hundred times in the new stage map. In this case, there is a problem that many times and many persons are required, and great expense is needed. To solve the problem, some embodiments of the present disclosure may provide a method and apparatus that an artificial intelligent computer instead of a person plays a game in new stage maps of a game.

(Patent document 1) Korean Patent No. 10-2030942

SUMMARY

An aspect of the present disclosure may provides a method and apparatus for predicting game difficulty by using a deep-learning based game play server for predicting a difficulty of a stage map of a match puzzle game using a deep-learning based game play server that performs the match puzzle game and modifying the stage map of the match puzzle game.

Particularly, some embodiments of the present disclosure may provide a method and apparatus for predicting game difficulty by using a deep-learning based game play server that provides a game play server for which a game play is available for a new stage map which is not learned.

Further, certain embodiments of the present disclosure may provide a method and apparatus for predicting game difficulty by using a deep-learning based game play server which may predict a game difficulty for a new stage map of a game.

Additionally, some embodiments of the present disclosure may provide a method and apparatus for predicting game difficulty by using a deep-learning based game play server that induces an interest for a game by adjusting a game difficulty of stage maps of the game.

According an aspect of the present disclosure, a deep-learning based game play server performing an action of arranging a manipulation puzzle in a fixed puzzle arranged on a stage map, and performing a match puzzle game in which when three or more puzzles of the same color are matched, the puzzles are removed and a score is obtained includes: at least one communication processor configured to receive a plurality of first stage maps of a first size and a plurality of second stage maps of a second size; a memory configured to store an agent model; at least one processor configured to perform learning of the agent model by reading out the agent model and perform the match puzzle game using the learned agent model; and at least one program stored in the memory and executed by the at least one processor, wherein the at least one program is configured to: perform first reinforcement learning of the agent model to perform an action of obtaining a high score for the plurality of second stage maps, arrange the plurality of first stage maps around a fixed puzzle at the center as much as the number of fixed puzzles and generate a plurality of partition stage maps of a second size, generate a training data set with each of the plurality of first stage maps as an input data and an action of a partition stage map of an action of obtaining a highest score among actions for the plurality of partition stage maps of the second size as a correct answer label, perform teacher learning of the first reinforcement learned agent model by using the training data set, and perform second reinforcement learning of the agent model which is teacher-learned for the plurality of the first stage maps.

In addition, the plurality of first stage maps and the plurality of second stage maps have game difficulties according to the arrangement of the fixe puzzles, and the program performs learning of the agent model by inputting in an order from a map of which game difficulty is low to a map of which game difficulty is high, when the plurality of first stage maps and the plurality of second stage maps are input.

In addition, the program performs learning of the agent model by additionally inputting gaussian noise to input of the first reinforcement learning or the second reinforcement learning.

In addition, a selection order of the manipulation puzzle is determined randomly with 4 colors when a game starts, wherein the action includes a basic action and a switch action, wherein the basic action is an action of changing a direction or a position of the manipulation puzzle to arrange it on the stage map, and wherein the switch action is an action of changing an order of the manipulation puzzles.

In addition, the manipulation puzzle has 4 colors, wherein the action includes a preparation action and a basic action, wherein the preparation action is an action of selecting a candidate puzzle to be used in the basic action as much as a predetermined number in the manipulation puzzles, and wherein the basic action is an action of changing a direction or a position of the candidate puzzle to arrange it on the stage map.

According another aspect of the present disclosure, at least one deep-learning based game difficulty prediction server that relates to a match puzzle game of performing an action of arranging a manipulation puzzle in a fixed puzzle arranged on a stage map, and performing a match puzzle game in which when three or more puzzles of the same color are matched, the puzzles are removed and a score is obtained, and predicts a user difficulty for a stage map which is not learned includes: at least one communication processor configured to receive a user success rate for a stage map which is not learned and a stage map which is learned; at least one memory configured to store an agent model, a game difficulty prediction model and a success rate of the agent model for the learned stage map; at least one processor configured to perform learning of the game difficulty prediction model by reading out the game difficulty prediction model and predict a game difficulty for the stage map which is not learned by using the learned game difficulty prediction model; and at least one program stored in the memory and executed by the at least one processor, wherein the at least one program is configured to: learn a game difficulty prediction model through binomial regression analysis using a difference between a success rate of the agent model for the stage map and a success rate of a user for the learned stage map, calculate a success rate of the agent model for the remaining stage map which is not learned, and predict a success rate of a user for the remaining stage map which is not learned with a success rate of the agent model for the remaining stage map which is not learned through the game difficulty prediction model as an input.

In addition, the program is configured to modify a difficulty of the stage map which is not learned using the success rate of a user for the stage map which is not learned.

In addition, the program is configured to increase a difficulty of the stage map which is not learned as a stage of the stage map goes up and decrease a difficulty of a next stage of n+5 stage lower than a difficulty of the previous stage (herein, n is a natural number of 1 or greater).

In addition, the program is configured to decrease a difficulty by arranging the fixed puzzle of a same color on a position adjacent to the fixed puzzle in the stage map which is not learned.

In addition, the communication processor receives a plurality of first stage maps of a first size and a plurality of second stage maps of a second size, and wherein the program is configured to: perform first reinforcement learning of the agent model to perform an action of obtaining a high score for the plurality of second stage maps, arrange the plurality of first stage maps around a fixed puzzle at the center as much as the number of fixed puzzles and generate a plurality of partition stage maps of a second size, generate a training data set with each of the plurality of first stage maps as an input data and an action of a partition stage map of an action of obtaining a highest score among actions for the plurality of partition stage maps of the second size as a correct answer label, perform teacher learning of the first reinforcement learned agent model by using the training data set, and perform second reinforcement learning of the agent model which is teacher-learned for the plurality of the first stage maps.

According another aspect of the present disclosure, it is disclosed a deep-learning based game play service method performing an action of arranging a manipulation puzzle in a fixed puzzle arranged on a stage map, and performing a match puzzle game in which when three or more puzzles of the same color are matched, the puzzles are removed and a score is obtained, the method performed by at least one deep-learning based game play server includes: receiving, by a communication unit, a plurality of first stage maps of a first size and a plurality of second stage maps of a second size; performing, by a processor, first reinforcement learning of the agent model to perform an action of obtaining a high score for the plurality of second stage maps, arranging, by the processor, the plurality of first stage maps around a fixed puzzle at the center as much as the number of fixed puzzles and generating a plurality of partition stage maps of a second size, generating, by the processor, a training data set with each of the plurality of first stage maps as an input data and an action of a partition stage map of an action of obtaining a highest score among actions for the plurality of partition stage maps of the second size as a correct answer label, performing, by the processor, teacher learning of the first reinforcement learned agent model by using the training data set, and performing, by the processor, second reinforcement learning of the agent model which is teacher-learned for the plurality of the first stage maps.

In addition, the plurality of first stage maps and the plurality of second stage maps have game difficulties according to the arrangement of the fixe puzzles, and wherein performing, by the processor, first reinforcement learning of the agent model to perform an action of obtaining a high score for the plurality of second stage maps performs learning of the agent model by inputting in an order from a map of which game difficulty is low to a map of which game difficulty is high, when the plurality of second stage maps is input.

In addition, the plurality of first stage maps and the plurality of second stage maps have game difficulties according to the arrangement of the fixe puzzles, and wherein performing, by the processor, second reinforcement learning of the agent model which is teacher-learned for the plurality of the first stage maps performs learning of the agent model by inputting in an order from a map of which game difficulty is low to a map of which game difficulty is high, when the plurality of first stage maps is input.

In addition, learning of the agent model is performed by additionally inputting gaussian noise to input of the first reinforcement learning or the second reinforcement learning.

In addition, a selection order of the manipulation puzzle is determined randomly with 4 colors when a game starts, wherein the action includes a basic action and a switch action, wherein the basic action is an action of changing a direction or a position of the manipulation puzzle to arrange it on the stage map, and wherein the switch action is an action of changing an order of the manipulation puzzles.

In addition, the method further includes performing learning of the game difficulty prediction model by reading out the game difficulty prediction model and predicting a game difficulty for the stage map which is not learned by using the learned game difficulty prediction model.

In addition, performing learning of the game difficulty prediction model by reading out the game difficulty prediction model and predicting a game difficulty for the stage map which is not learned by using the learned game difficulty prediction model includes: learning the game difficulty prediction model through binomial regression analysis using a difference between a success rate of the agent model for the stage map which is previously learned and a success rate of a user for the learned stage map, calculating a success rate of the agent model for the remaining stage map which is not learned, and predicting the success rate of a user for the remaining stage map which is not learned with the success rate of the agent model for the remaining stage map which is not learned through the game difficulty prediction model as an input.

In addition, the method further includes modifying a difficulty of the stage map which is not learned using the success rate of a user for the stage map which is not learned.

In addition, modifying the difficulty of the stage map which is not learned includes: increasing a difficulty of the stage map which is not learned as a stage of the stage map goes up and decreasing a difficulty of a next stage of n+5 stage lower than a difficulty of the previous stage (herein, n is a natural number of 1 or greater).

In addition, modifying the difficulty of the stage map which is not learned includes: decreasing a difficulty by arranging the fixed puzzle of a same color on a position adjacent to the fixed puzzle in the stage map which is not learned.

Advantageous Effects

A method and apparatus for predicting game difficulty by using a deep-learning based game play server according to an embodiment of the present disclosure may predict a difficulty of a stage map of a match puzzle game by using a deep-learning based game play server that performs the match puzzle game and modify stage maps of the match puzzle game.

Further, a method and apparatus for predicting game difficulty by using a deep-learning based game play server according to an embodiment of the present disclosure may provide a game play server for which a game play is available for a new stage map which is not learned.

Additionally, a method and apparatus for predicting game difficulty by using a deep-learning based game play server according to an embodiment of the present disclosure may predict a game difficulty for a new stage map of a game.

In addition, a method and apparatus for predicting game difficulty by using a deep-learning based game play server according to an embodiment of the present disclosure may induce an interest for a game by adjusting a game difficulty of stage maps of the game.

BRIEF DESCRIPTION OF THE DRAWINGS

FIG. 10 is a flowchart for a deep-learning based game play service method according to an embodiment of the present disclosure.

DESCRIPTION OF EXEMPLARY EMBODIMENTS

Figure 1:
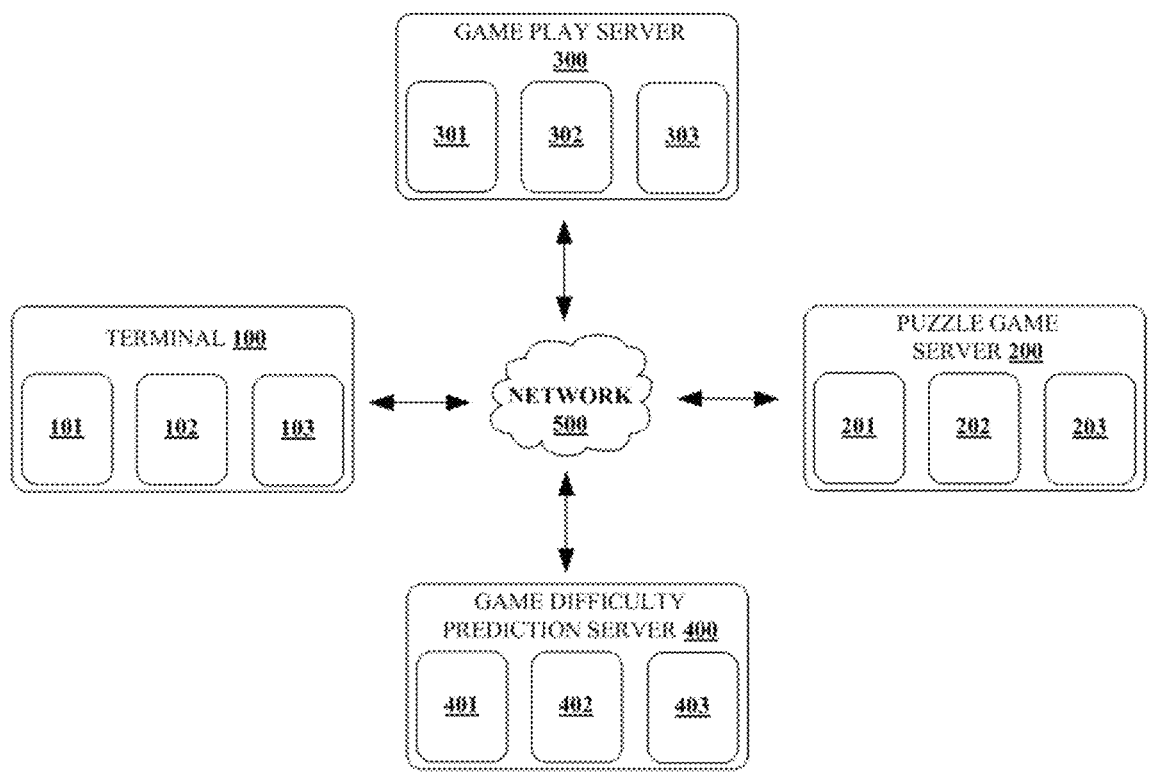
FIG. 1 illustrates a system for predicting game difficulty by using a deep-learning based game play server according to an embodiment of the present disclosure.

The present disclosure may have various modifications and various embodiments, and specific embodiments will be illustrated in the drawings and described in detail in the detailed description. The technical effect and feature of the present disclosure and the method for attain it become clear by referring to the embodiments described below together with the drawings. However, the present disclosure may not be limited to the embodiments disclosed below but may be implemented in various forms. In the following embodiments, the terms "first" and "second" are used to distinguish one element from another element, and the scope of the present disclosure should not be limited by these terms. In addition, a singular expression should be interpreted that the singular expression includes a plural expression unless it does not mean otherwise in the context. Furthermore, the term "include" or "have" indicates that a feature or a component described in the specification is present but does not exclude a possibility of presence or addition of one or more other features or components in advance. In addition, for the convenience of description, sizes of components are enlarged or reduced in the drawings. For example, a size and a thickness of each component shown in the drawings arbitrarily for the convenience of description, and the present disclosure is not limited thereto.

Hereinafter, preferred embodiments of the present disclosure will be described in detail with reference to the accompanying drawings and in describing the preferred embodiments with reference to the accompanying drawings, the same reference numeral will refer to the same or corresponding component regardless of the reference numeral and a duplicated description thereof will be omitted.

FIG. 1 illustrates a system for predicting game difficulty by using a deep-learning based game play server according to an embodiment of the present disclosure.

Referring to FIG. 1, the system for predicting game difficulty by using the deep-learning based game play server according to an embodiment may include a terminal 100, a puzzle game server 200, a game play server 300 and a game difficulty prediction server 400.

Each of the elements of the system of FIG. 1 may be connected through a network 500. The network 500 may mean a connection structure available to data, signal and information exchange among the nodes such as the terminal 100, the puzzle game server 200, the game play server 300 and the game difficulty prediction server 400. An example of the network may include 3GPP (3rd Generation Partnership Project) network, LTE (Long Term Evolution) network, WIMAX (World Interoperability for Microwave Access) network, Internet, LAN (Local Area Network), Wireless LAN (Wireless Local Area Network), WAN (Wide Area Network), PAN (Personal Area Network), Bluetooth network, Satellite broadcasting network, Analogue broadcasting network, DMB (Digital Multimedia Broadcasting), and the like, but not limited thereto.

<Terminal 100>

First, the terminal 100 is a terminal of a user intended to receive a puzzle game service. For example, the terminal 100 may be configured to provide a user interface for the puzzle game service through an application, web and program. In addition, the terminal 100 is one or more computer or other electronic device used by the user to execute applications for performing various tasks. For example, the terminal 100 includes a computer, a laptop computer, a smart phone, a mobile telephone, a PDA, a tablet PC or an arbitrary other device available to operate to communicate with the puzzle game server 200, but not limited thereto. The terminal 100 may include a processing logic for interpreting and executing multiples commands stored in a memory, and may include other various elements like processors that display graphic information for a graphic user interface (GUI) on an external input/output device. Furthermore, the terminal 100 may be connected to an input device (e.g., a mouse, a keyboard, a touch sensitive surface, etc.) and an output device (e.g., a display device, a monitor, a screen, etc.). The applications executed by the terminal 100 may include a game application, a web browser, a web application operating in a web browser, word processors, media players, spreadsheets, image processors, security software or the like.

In addition, the terminal 100 may include at least one memory 101 for storing commands, data, information and instructions, at least one processor 102 and a communication unit or communicator 103.

The memory 101 of the terminal 100 may store one or more of application programs or applications operated in the terminal 100, data for operating the terminal 100, and commands or instructions. The commands or instructions may be executable by the processor 102 such that the processor 102 performs the commands or instructions for operations, and the operations may include, for example, but not limited to, a transmission of a puzzle game execution request signal, a transmission/reception of game data, a transmission/reception of action information, a transmission/reception of success rate for a stage map, a reception of various types of information, and a transmission and/or reception of any signal, data, information associated with the game service. Furthermore, the memory 101 may be various types of storage device such as ROM, RAM, EPROM, flash drive, hard drive, and the like as hardware, and the memory 101 may be a web storage that performs a storage function of the memory 101 on internet.

The processor 102 of the terminal 100 may control an overall operation of the terminal 100 and perform a data processing for a puzzle game service. When a puzzle game application is executed in the terminal 100, a puzzle game environment is configured in the terminal 100. And, the puzzle game application exchanges puzzle game data with the puzzle game server 200 through the network 500 to execute the puzzle game service on the terminal 100. Such a processor 102 may be, for example, but not limited to, ASICs (application specific integrated circuits), DSPs (digital signal processors), DSPDs (digital signal processing devices), PLDs (programmable logic devices), FPGAs (field programmable gate arrays), controllers, micro-controllers, microprocessors, or any other processors for performing functions.

The communication unit 103 of the terminal 100 may transmit and receive a wireless or wired signal with at least one of a base station, an external terminal and a server on a network constructed based on the following communication scheme (e.g., GSM (Global System for Mobile communication), CDMA (Code Division Multi Access), HSDPA (High Speed Downlink Packet Access), HSUPA (High Speed Uplink Packet Access), LTE (Long Term Evolution), LTE-A (Long Term Evolution-Advanced), WLAN (Wireless LAN), Wi-Fi (Wireless-Fidelity), Wi-Fi (Wireless Fidelity) Direct, DLNA (Digital Living Network Alliance), WiBro (Wireless Broadband) and WiMAX (World Interoperability for Microwave Access).

<Puzzle Game Server 200>

A puzzle game may be, for example, but not limited to, a 3-match puzzle game, in which an action of arranging a manipulation puzzle is performed in a fixed puzzle arranged on a stage map, and when 3 or more puzzles of the same color is matched, the puzzles are removed and a score is obtained.

The puzzle game service provided by the puzzle game server 200 may be configured in a form in which a virtual computer player provided by the puzzle game server 200 and a real user take part in a game. Accordingly, in a puzzle game environment implemented on the terminal 100 of a user side, a real user and a virtual computer player play a game together. In other aspect, the puzzle game service provided by the puzzle game server 200 may be configured in a form in which a plurality of devices of user side takes part in a game and the puzzle game is played.

The puzzle game server 200 may include at least one memory 201 for storing commands, data, information and instructions, at least one processor 202 and a communication unit or communicator 203.

The memory 201 of the puzzle game server 200 may store a plurality of application programs or applications operated in the puzzle game server 200, data for operating the puzzle game server 200, and commands or instructions. The commands or instructions may executable by the processor 202 such that the processor 202 performs operations of the puzzle game server 200, and the operations may include a reception of a game execution request signal, a transmission/reception of game data, a transmission/reception of action information and various types of transmission operation, and a transmission and/or reception of any signal, data, information associated with the game service. Furthermore, the memory 201 may be various types of storage device such as ROM, RAM, EPROM, flash drive, hard drive, and the like as hardware, and the memory 201 may be a web storage that performs a storage function of the memory 201 on internet.

The processor 202 of the puzzle game server 200 may control an overall operation of the puzzle game server 200 and perform a data processing for a puzzle game service. Such a processor 202 may be ASICs (application specific integrated circuits), DSPs (digital signal processors), DSPDs (digital signal processing devices), PLDs (programmable logic devices), FPGAs (field programmable gate arrays), controllers, micro-controllers, microprocessors, or other processors of arbitrary shapes for performing functions.

The puzzle game server 200 may perform a communication with the terminal 100, the game play server 300 and the game difficulty prediction server 400 via the network 500 through the communication unit or communicator 203.

<Game Play Server 300>

The game play server 300 may include a separate cloud server or a computing device. In addition, the game play server 300 may be a neural network system installed on the processor 102 of the terminal 100 or the data processor 202 of the puzzle game server 200 or a neural network system installed on a data processor 402 of the game difficulty prediction server 400, but hereinafter, it is described that the game play server 300 is a separate device from the terminal 100, the puzzle game server 200 or the game difficulty prediction server 400 for illustration purposes only.

The game play server 300 may include at least one memory 301 for storing commands, data, information and instructions, at least one processor 302 and a communication unit or communicator 303.

The game play server 300 is an artificial intelligence computer that is available to construct an agent model which is a deep-learning model by learning autonomously a puzzle game rule and play a game in a stage map. The detailed exemplary embodiments for training the game play server 300 with the agent model will be described with reference to FIG. 10 to FIG. 13.

The memory 301 of the game play server 300 may store a plurality of application programs or applications operated in the game play server 300, data for operating the game play server 300, and commands or instructions. The commands or instructions may be executable by the processor 302 such that the processor 302 performs operations of the game play server 300, and the operations may include an agent model learning (training) operation, a transmission/reception of action information and various types of transmission operation. In addition, the memory 301 may store an agent model which is a deep-learning model. Furthermore, the memory 301 may store a success rate of the agent model, a stage map used in learning, a stage map not used in learning and training data set for learning. In addition, the memory 301 may be various types of storage device such as ROM, RAM, EPROM, flash drive, hard drive, and the like as hardware, and the memory 301 may be a web storage that performs a storage function of the memory 301 on internet.

The processor 302 of the game play server 300 reads out the agent model stored in the memory 302 and perform an agent model learning and manipulation puzzle action described below according to the constructed neural network system. In one embodiment, the processor 302 may include a main processor for controlling the whole units of the game play server 300 and a plurality of Graphic Processing Units (GPUs) for processing large amount of operations required when driving a neural network according to the agent model.

The game play server 300 may perform a communication with the puzzle game server 200 or the game difficulty prediction server 400 via the network 500 through the communication unit or communicator 303.

<Game Difficulty Prediction Server 400>

The game difficulty prediction server 400 may include a separate cloud server or a computing device. In addition, the game difficulty prediction server 400 may be a neural network system installed on the processor 102 of the terminal 100 or the data processor 202 of the puzzle game server 200, but hereinafter, it is described that the game difficulty prediction server 400 is a separate device from the terminal 100 or the puzzle game server 200 for illustration purposes only.

The game difficulty prediction server 400 may include at least one memory 401 for storing commands, data, information and instructions, at least one processor 402 and a communication unit or communicator 403.

The game difficulty prediction server 400 may receive a user success rate from the puzzle game server 200 or a success rate of an agent model from the game play server 300 through the communication unit 403. The game difficulty prediction server 400 may learn a game difficulty prediction model using the received user success rate and the received success rate of the agent model. The detailed description for the game difficulty prediction server 400 for learning the game difficulty prediction model based on the game difficulty prediction model is described with reference to FIG. 5. Furthermore, in the game difficulty prediction server 400, a game difficulty adjusting unit may adjust a game difficulty of a stage map based on the predicted game difficulty. The detailed description for game difficulty adjustment is described with reference to FIG. 6 to FIG. 9.

The memory 401 of the game difficulty prediction server 400 may store one or more of application programs or applications operated in the game difficulty prediction server 400, data for operating the game difficulty prediction server 400 and commands or instructions. The commands or instructions may be executable by the processor 402 such that the processor 402 performs operations of the game difficulty prediction server 400, and the operations may include a game difficulty prediction model learning (training) operation, a performance of game difficulty prediction, an adjustment of game difficulty of a stage map and various types of transmission operation. In addition, the memory 401 may store a game difficulty prediction model and a game difficulty adjustment unit which are a deep-learning model. Furthermore, the memory 401 may be various types of storage device such as ROM, RAM, EPROM, flash drive, hard drive, and the like as hardware, and the memory 401 may be a web storage that performs a storage function of the memory 401 on internet.

The processor 402 of the game difficulty prediction server 400 reads out a game difficulty prediction model stored in the memory 402 and perform a game difficulty prediction or a game difficulty adjustment for a stage map described below according to the constructed neural network system. In one embodiment, the processor 402 may include a main processor for controlling the whole units the game difficulty prediction server 400 and a plurality of Graphic Processing Units (GPUs) for processing large amount of operations required when driving a neural network according to the game difficulty prediction model.

The game difficulty prediction server 400 may perform a communication with the puzzle game server 200 or the game play server 300 via the network 500 through the communication unit or communicator 403.

<Agent Model 310>

Figure 2:
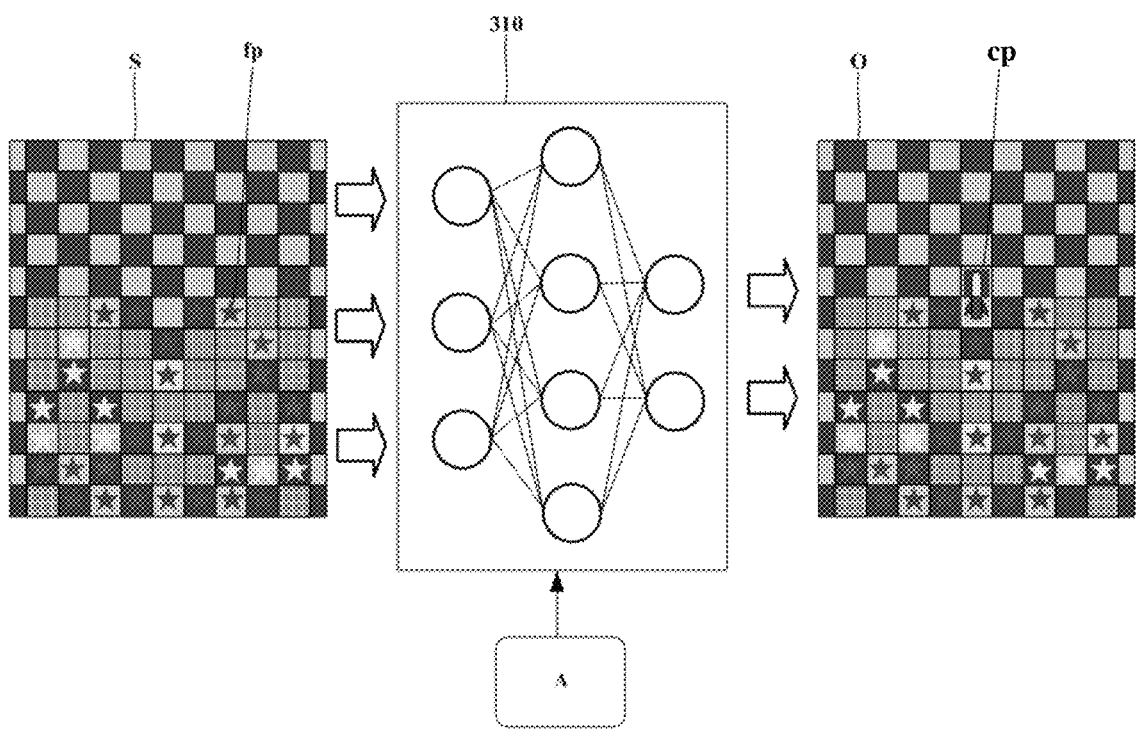
FIG. 2 is a diagram for illustrating an agent model for an action in a stage map in a deep-learning based game play server according to an embodiment of the present disclosure.
Figure 3:
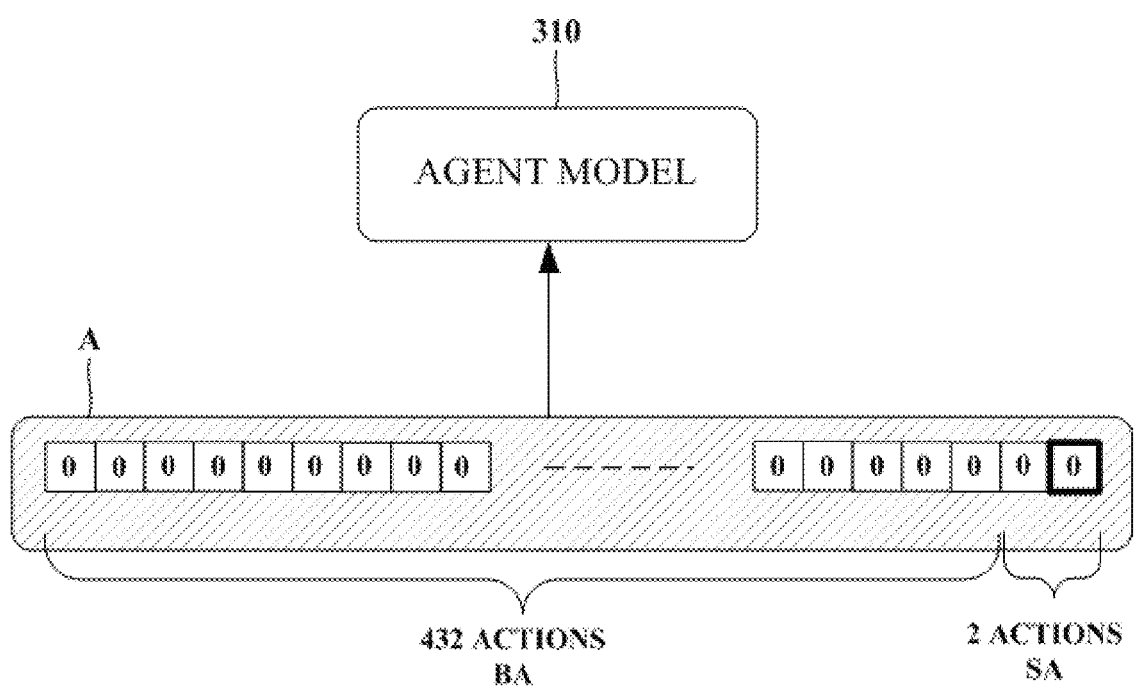
FIG. 3 illustrates an example for showing an action scheme of the agent model shown in FIG. 2.
Figure 4:
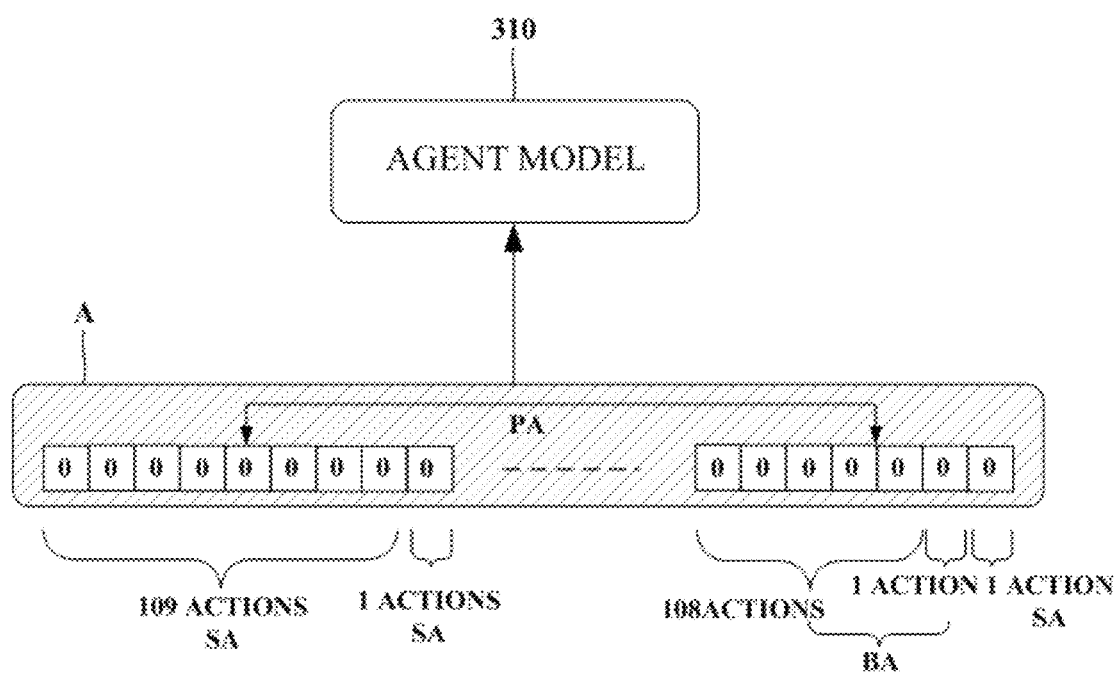
FIG. 4 illustrates another example for showing an action scheme of the agent model shown in FIG. 2.

FIG. 2 is a diagram for illustrating an agent model for an action in a stage map in a deep-learning based game play server according to an embodiment of the present disclosure. FIG. 3 illustrates an example for showing an action scheme of the agent model shown in FIG. 2, and FIG. 4 illustrates another example for showing an action scheme of the agent model shown in FIG. 2.

An agent model 310 according to an embodiment of the present disclosure may be a deep-learning model of the game play server 300. The agent model 310 may perform any one action O of available actions A for a current state S of a stage map. Particularly, the agent model 310 may perform an action O of obtaining a high score in the current state S of the stage map. For example, referring to FIG. 2, the stage map may include 9 sections in horizontal and 12 sections in vertical. In the stage map, a fixed puzzle fp of 1 section size and 4 types of colors may be arranged. A manipulation puzzle cp has 2 section size and configured with 2 colors or only a color of the corresponding 4 types of colors of the fixed puzzle fp. The agent model 310 may manipulate or move the manipulation puzzle cp such that the colors of the manipulation puzzle cp and the fixed puzzle fp are matched as the same as each other. The available action A of the agent model 310 may include a position change, a rotation, and the like. In one example, referring to FIG. 3, the available action A of the agent model 310 may include one or more basic actions BAs and one or more specific actions SAs. The basic action BA may be an action of changing a direction or a position of the manipulation puzzle cp to arrange it on the stage map. The basic action BA may include 432 (9×12×4) types of actions considering stage map sizes and puzzle colors. The specific action SA may include a skill action and a switch action. The switch action is an action of changing an order of the manipulation puzzles cp arranged in order, which are randomly generated. In another example, referring to FIG. 4, the available action A of the agent model 310 may include one or more basic actions BAs, one or more specific actions SAs and one or more preparation actions PAs. The description of the basic action BA and the specific action SA are the same as the example described above. The preparation action PA is an action of selecting a candidate puzzle to be used in the basic action BA as much as a predetermined number in the manipulation puzzles cp before starting a game. That is, in the case that the agent model 310 performs an action A including the preparation action PA, the agent model 310 may select a candidate of the manipulation puzzles cp to be used in a game play through the preparation action PA before starting a game. In addition, the preparation action PA may select any one specific action of a plurality of specific actions SA as a candidate specific action before starting a game and perform the candidate specific action during the game play.

Furthermore, the agent model 310 may perform a 3-match puzzle game even in a new map which is not learned. The method of learning for the agent model 310 to perform 3-match puzzle game even in a new map is based on the agent model learning method shown in FIG. 10 to FIG. 13.

<Game Difficulty Prediction Model 410 and Game Difficulty Adjustment>

Figure 5:
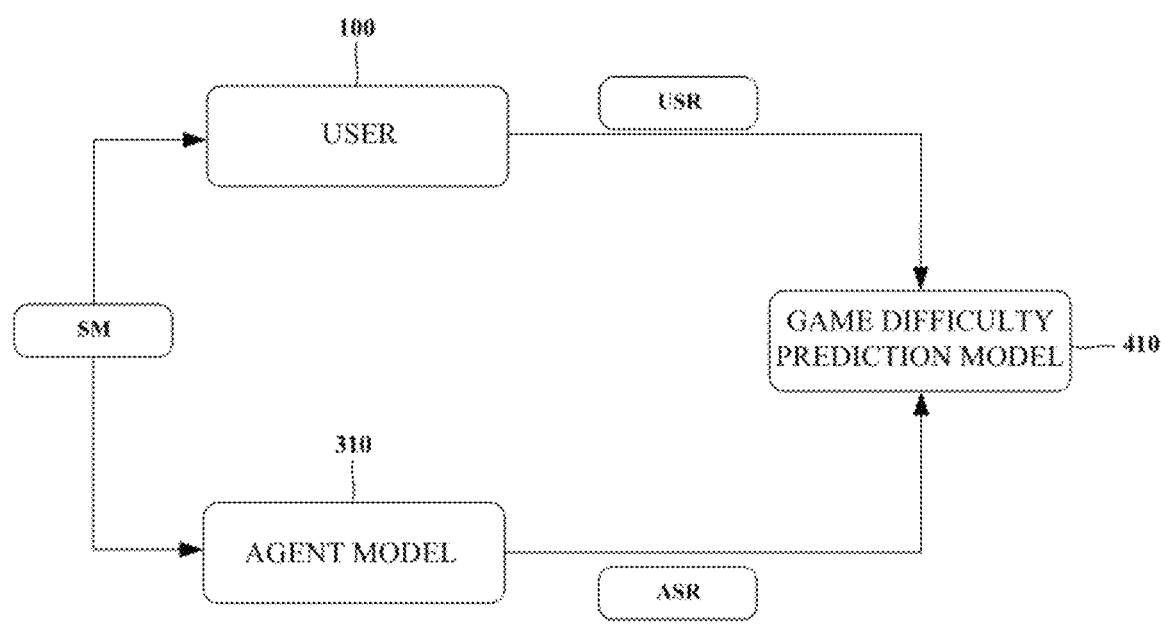
FIG. 5 is a diagram for illustrating a method of generating a game difficulty prediction model in a game difficulty prediction server according to an embodiment of the present disclosure.
Figure 6:
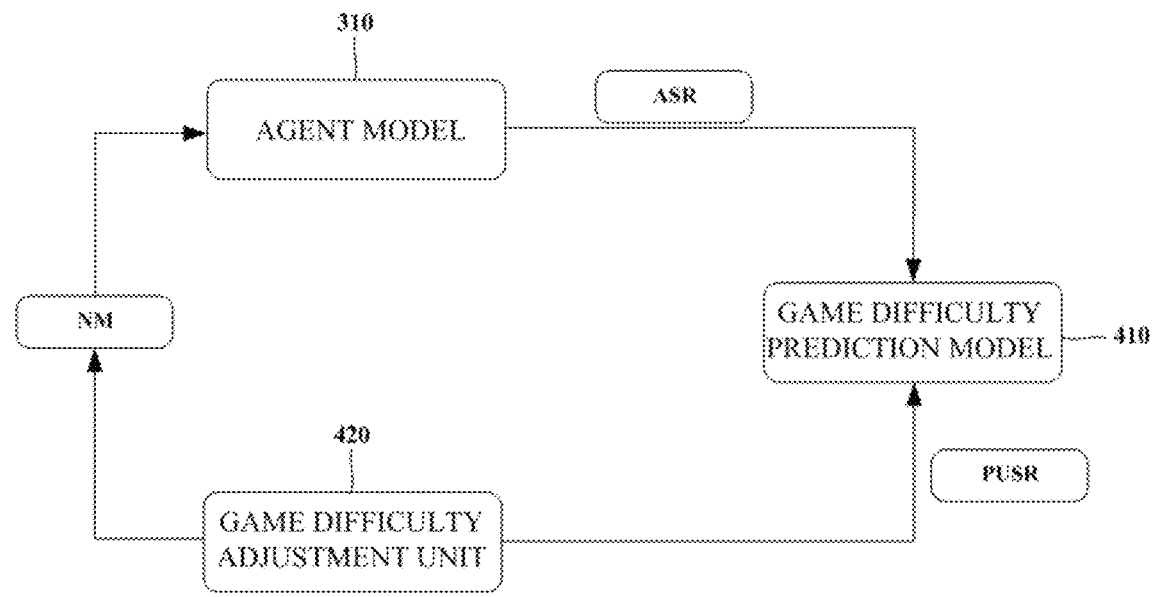
FIG. 6 is a diagram for illustrating a method of predicting a game difficulty and adjusting a game difficulty for a new map in a game difficulty prediction server according to an embodiment of the present disclosure.
Figure 7:
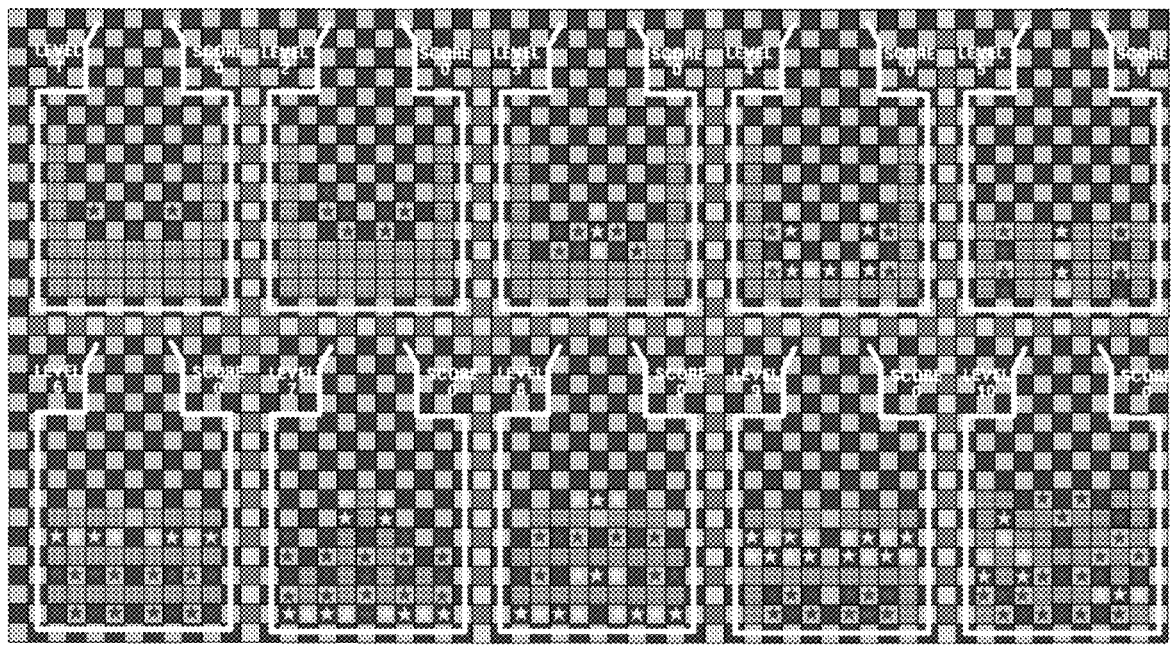
FIG. 7 is an exemplary diagram of a stage map according to a game difficulty according to an embodiment of the present disclosure.
Figure 8:
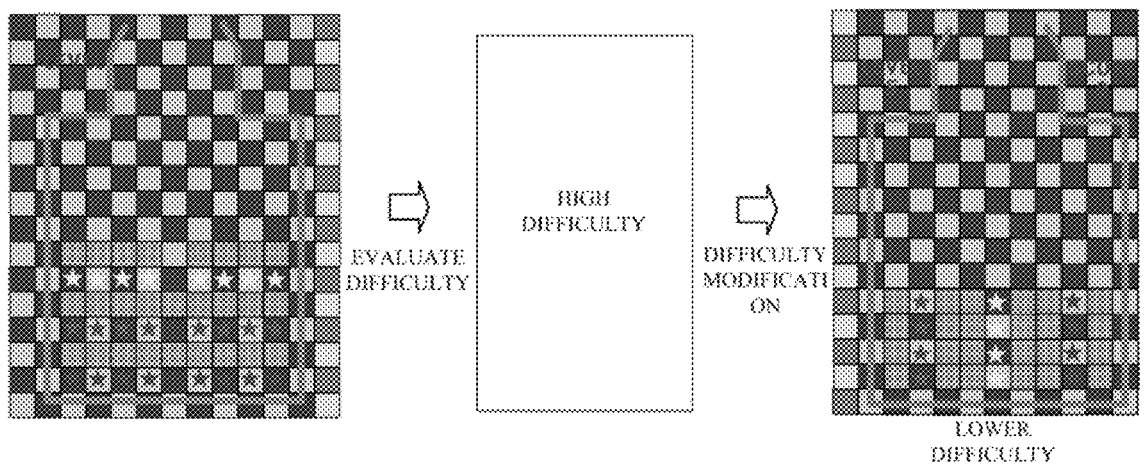
FIG. 8 is a diagram for illustrating a method of adjusting a game difficulty of a stage map according to an embodiment of the present disclosure.
Figure 9:
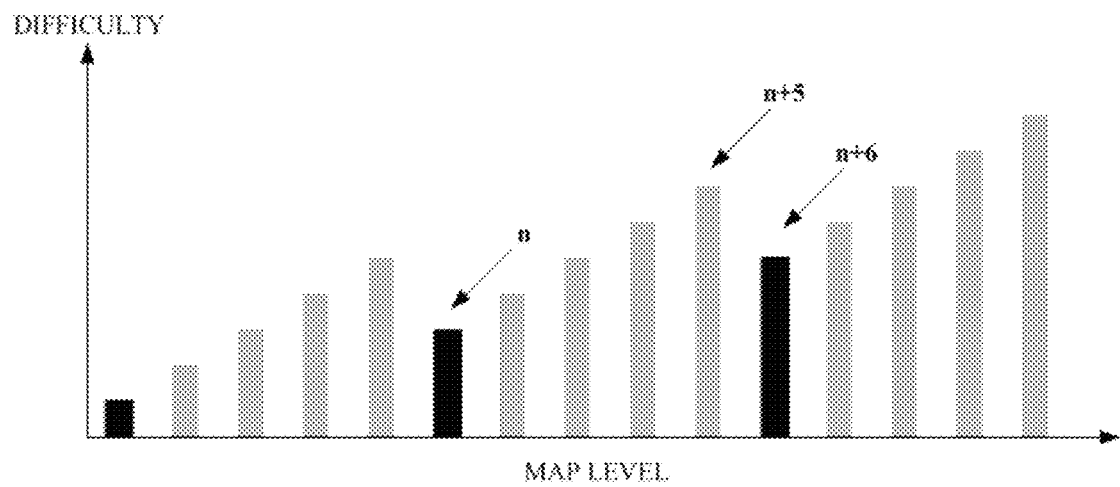
FIG. 9 is an exemplary diagram of setting a game difficulty according to a stage of a stage map according to an embodiment of the present disclosure.

FIG. 5 is a diagram for illustrating a method of generating a game difficulty prediction model in a game difficulty prediction server according to an embodiment of the present disclosure, and FIG. 6 is a diagram for illustrating a method of predicting a game difficulty and adjusting the game difficulty for a new map in a game difficulty prediction server according to an embodiment of the present disclosure. FIG. 7 is an exemplary diagram of a stage map according to a game difficulty according to an embodiment of the present disclosure, and FIG. 8 is a diagram for illustrating a method of adjusting a game difficulty of a stage map according to an embodiment of the present disclosure. FIG. 9 is an exemplary diagram of setting a game difficulty according to a stage of a stage map according to an embodiment of the present disclosure.

A game difficulty prediction model 410 may predict a game difficulty for a stage map which is not learned. Referring to FIG. 5, in order for the game difficulty prediction model 410 to predict a game difficulty for a stage map which is not learned, learning needs to be performed by using a success rate of an agent model 310 (ASR) for a learned stage map SM and a success rate of a user 110 (USR). The success rate of the user 110 (USR) may be a success rate stored in the terminal 100. The learning method of the game difficulty prediction model 410 is, for example, but not limited to, performing a linear analysis using a difference between the success rate of the user 110 (USR) for the learned stage map (SM) and the success rate of the agent model 310 (ASR) for the learned stage map (SM). One example of the linear analysis is binomial regression analysis. The success rate may be a rate of the number of successes of clearing a game with respect to the number of trials of a game play in a stage map. The learned stage map (SM) may be a learned stage map of the agent model 310 or a stage map provided from the puzzle game server 200 on the terminal 100 of the user 110. Referring to FIG. 6, as a result of the learning, according to the game difficulty prediction model 410, when a user inputs the success rate of the agent model 310 (ASR), a predicted USR (PUSR) becomes predictable, and therefore, a game difficulty may be predicted. The game difficulty prediction model 410 may output the predicted stage rate of a user (PUSR) with the success rate of the agent model 310 (ASR) as an input according to Equation 1.

$$PUSR = \lambda_1 \times ASR + \lambda_2 \times F_1 + \lambda_3 \times F_2 \times \quad \text{(Equation 1)}$$

In Equation 1, $\lambda_1$ is a hyper parameter of the success rate of the agent model 310 (ASR). $F_1, F_2, \ldots$ are one or more unique properties for a stage map. $\lambda_2, \lambda_3, \ldots$ are hyper parameters for respective unique properties of the stage map.

In addition, the game difficulty prediction server 400 may adjust a stage map which is not learned (NM), that is a game difficulty for a new map by using the game difficulty prediction model 410 and a game difficulty adjustment unit 420. The difficulty of the stage map may be determined according to the number of fixed puzzles, a degree of adjacency of fixed puzzle, the number of usable manipulation puzzles, an arrangement of fixed puzzle, and the like. In one example, FIG. 7 shows an example of a stage map in which as a level of game difficulty increases from level 1 to level 10, the number of fixed puzzles is increased, and an adjacency of a fixed puzzle of the same color is increased, and therefore, a game difficulty is also increased. That is, as the game difficulty increases, it becomes harder to remove a fixed puzzle with 3-match with an action of a manipulation puzzle. Furthermore, the game difficulty prediction server 400 may receive a success rate of the agent model 310 (ASR) by playing a stage map which is not learned (NM) with the agent model 310. The game difficulty prediction server 400 may calculate a predicted stage rate of a user (PUSR) with the success rate of the agent model 310 (ASR) as an input by using the game difficulty prediction model 410. The game difficulty prediction server 400 may adjust a game difficulty of the stage map which is not learned (NM) by the game difficulty adjustment unit 420 based on the predicted stage rate of a user (PUSR). The game difficulty adjustment is performed by adjusting the number of fixed puzzles, a degree of adjacency of fixed puzzle, the number of usable manipulation puzzles, an arrangement of fixed puzzle, and the like. In one example, in order to higher a game difficulty, the number of fixed puzzles may be increased, fixed puzzles of the same color are arranged farther, or the number of usable manipulation puzzles may be decreased. In order to lower a game difficulty, the number of fixed puzzles may be decreased, fixed puzzles of the same color are arranged closer with each other, or the number of usable manipulation puzzles may be increased. For example, referring to FIG. 8, the game difficulty prediction server 400 evaluates a difficulty of a stage map. In the case that the difficulty is evaluated to be high, the game difficulty prediction server 400 may decrease the number of fixed puzzles and changes an adjustment of the fixed puzzles, and accordingly, may lower the difficulty of the game.

Referring to FIG. 9, the game difficulty prediction server 400 may increase a difficulty of a stage map as a stage of the stage map goes up, and may decrease a difficulty of the next stage of n+5 stage lower than a difficulty of the previous stage. Herein, n is a natural number. That is, a difficulty of n+6 stage may be lower than a difficulty of n+5 stage. In the case that a game difficulty becomes higher continually as a stage goes up, a user may feel that the game is difficult and lose an interest on playing the game. Accordingly, the game difficulty prediction server 400 of the present disclosure may adjust a game difficulty in such a way of increasing and decreasing, and increasing again, and therefore, induce an interest of a user to enjoy playing the game.

Accordingly, an apparatus for predicting game difficulty by using a deep-learning based game play server according to an embodiment of the present disclosure may predict a difficulty of a stage map and modify the stage map by using the deep-learning based game play server that performs 3-match puzzle game. Furthermore, an apparatus for predicting game difficulty by using a deep-learning based game play server according to an embodiment of the present disclosure may provide a game play server for which a game play is available even in a new map which is not learned. In addition, a method and apparatus for predicting game difficulty by using a deep-learning based game play server according to embodiments of the present disclosure may predict a game difficulty for a new stage map. Furthermore, an apparatus for predicting game difficulty by using a deep-learning based game play server according to an embodiment of the present disclosure may adjust a game difficulty of a stage map and induce an interest in playing a game.

<Deep-Learning Based Game Play Service Method>

Figure 11:
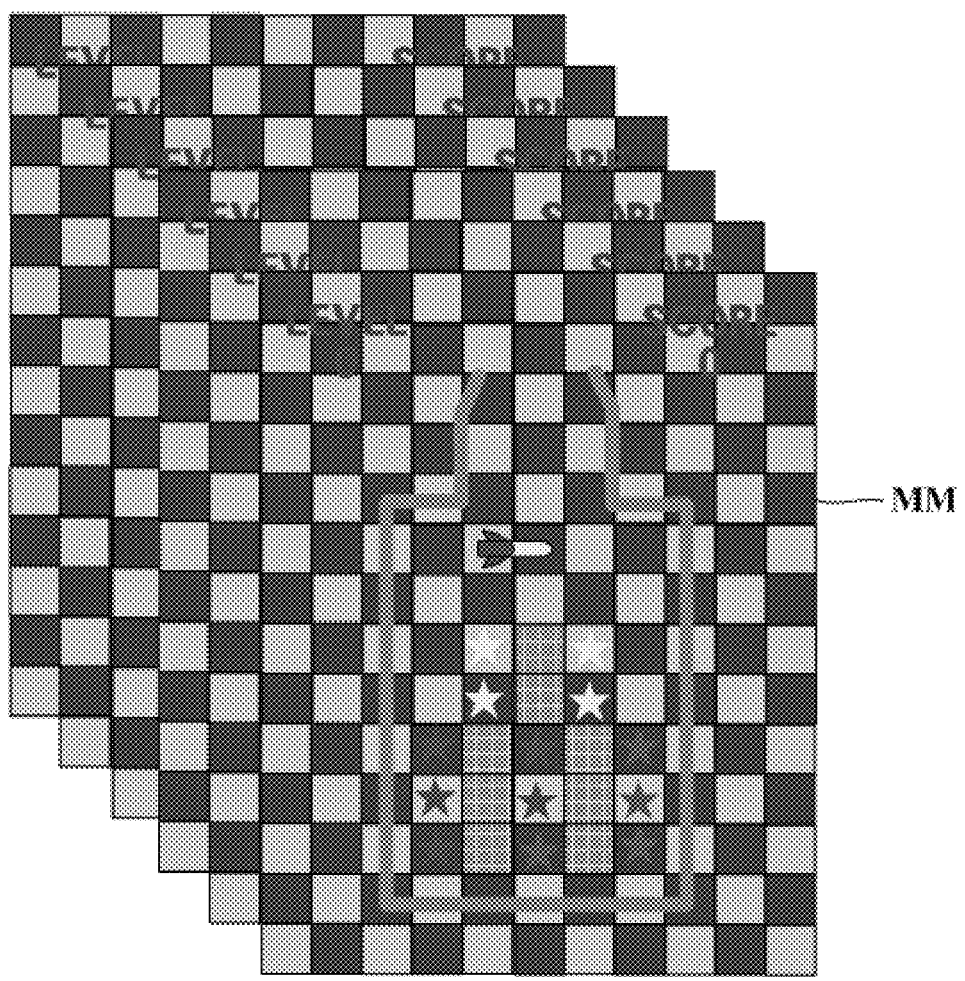
FIG. 11 is an exemplary diagram for a plurality of second stage maps of the deep-learning based game play service method shown in FIG. 10.
Figure 12:
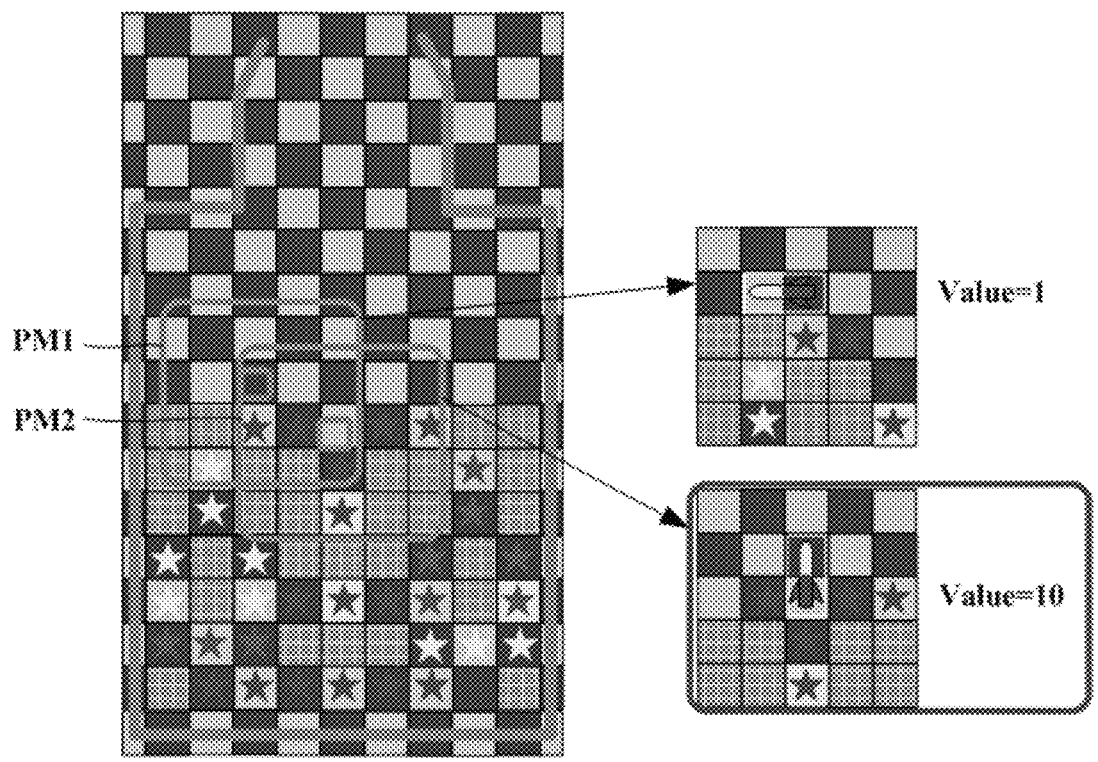
FIG. 12 is an exemplary diagram for illustrating a method for generating a plurality of partition stage maps and generating a training data set of the deep-learning based game play service method shown in FIG. 10.

FIG. 10 is a flowchart for a deep-learning based game play service method according to an embodiment of the present disclosure, and FIG. 11 is an exemplary diagram for a plurality of second stage maps of the deep-learning based game play service method shown in FIG. 10. FIG. 12 is an exemplary diagram for describing a method for generating a plurality of partition stage maps and generating a training data set of the deep-learning based game play service method shown in FIG. 10.

A deep-learning based game play service method may perform a 3-match puzzle game in which an action of arranging a manipulation puzzle is performed in a fixed puzzle arranged on a stage map, and when three or more puzzles of the same color are matched, the puzzles are removed and a score is obtained.

Referring to FIG. 10, the deep-learning based game play service method according to an embodiment of the present disclosure may include a step S1001 of receiving a plurality of first stage maps of a first size and a plurality of second stage maps of a second size. Particularly, the first stage map is the first size, and the second stage map is the second size. The first stage map is a stage map that the actual puzzle game server 200 provides to the terminal 100. The second stage map is a stage map used for an agent model's learning. The first size of the first stage map may be greater than the second size of the second stage map. That is, the second stage map may be a mini map of, or be smaller than, the first stage map. In one example, the first size of the first stage map may be 9×12 size as shown in FIG. 2 and FIG. 7. The second size of the second stage map (MM) may be 5×5 size as shown in FIG. 11.

In addition, the deep-learning based game play service method according to an embodiment of the present disclosure may include a step S1002 of performing first reinforcement learning of the agent model 310 so as to perform an action of obtaining a high score for a plurality of second stage maps (MM). Particularly, the game play server 300 may perform a reinforcement learning using the second stage map (MM), not the first stage map to perform the first reinforcement learning. In the case of performing the reinforcement learning using the first stage map from the start, there are many numbers of cases since the size of the first stage map is too large. Accordingly, there is a problem that the agent model 310 cannot be learned. Therefore, in the case of using the second stage map, which is a mini map of, or is smaller than, the first stage map of small number of cases, the agent model 310 may perform a game play for the second stage map and obtain a score to perform a reinforcement learning. The first reinforcement learning may use Random Network Distillation (RND). The RND may include target, prediction and policy neural networks. The policy neural network is a neural network for determining an action of the agent, and the target and prediction neural networks are neural network of receiving a next state value as an input and outputting a certain feature value. A weight for the target neural network is randomly set and fixed. The prediction neural network is a neural network having the same structure as the target neural network and learned to output the same output of the target neural network. That is, since there is an effect of distillation of a random neural network to the prediction neural network, it is called a random network distillation. In the RND, a method is selected, in which a value function for an intrinsic reward and a value function for an extrinsic reward are obtained separately and combined, and Proximal Policy Optimization (PPO) is used for optimizing the policy neural network. Furthermore, when performing the first reinforcement learning of the agent model 310, the game play server 300 may mix the second stage map (MM) with gaussian noise to input. In this case, the learning of the agent model 310 may be more efficiently performed. In addition, when inputting a plurality of second stage maps in the case of performing the first reinforcement learning of the agent model 310, the game play server 300 may perform the reinforcement learning by inputting in an order from a map of which game difficulty is low to a map of which game difficulty is high. Accordingly, the learning of the agent model may be more efficiently performed.

Furthermore, the deep-learning based game play service method according to an embodiment of the present disclosure may include a step S1003 of arranging a plurality of first stage maps around a fixed puzzle at the center as much as the number of fixed puzzles and generating a plurality of partition stage maps of a second size. In one example, as shown in FIG. 12, a plurality of partition stage maps (PM) may be generated around a fixed puzzle at the center in a certain stage map. FIG. 12 shows a first partition stage map PM1 and a second partition stage map PM2. The partition stage map PM partitions a window as much as a predetermined area in a stage map. In one example, a size of the partition stage map may be 5×5 size. The game play server 300 enables the agent model 310 learned with a stage map of a second size to determine an action of a manipulation puzzle for each of the partition stage maps of the second size in a first stage map.

In addition, the deep-learning based game play service method according to an embodiment of the present disclosure may include a step S1004 of generating a training data set with each of a plurality of first stage maps as an input data and an action of a partition stage map of an action of obtaining a highest score among actions for a plurality of partition stage maps of a second size as a correct answer label. More particularly, the game play server 300 selects an action in a partition game map of performing an action of the agent model 310 obtaining a highest score among actions for a plurality of partition stage maps existed in a predetermined first stage map and performs an action in the first stage map. That is, the agent model 310 selects the best action among a plurality of partition stage maps. In one example, as shown in FIG. 12, there are the first partition stage map PM1 and the second partition stage map PM2 in the first stage map. The score obtained by arranging a manipulation puzzle on a fixed puzzle and 3-match removing in the first partition stage map PM1 is 1 point. The score obtained by arranging a manipulation puzzle on a fixed puzzle and 3-match removing in the second partition stage map PM2 is 10 points. The action in the second partition stage map PM2 may obtain higher score than the action in the first partition stage map PM1. In addition, the game play server 300 may designate an action in the second partition stage map PM2 as a correct answer label for the first stage map and include a predetermined first stage map and the second partition stage map PM2 in a training data set. The game play server may generate a correct answer label for a plurality of the first stage map and collect a training data set in the same way. Furthermore, when inputting a plurality of first stage maps in the case of performing teacher learning of the agent model 310, the game play server 300 may perform the reinforcement learning by inputting in an order from a map of which game difficulty is low to a map of which game difficulty is high. In this case, the training data set may be configured in an order from a map of which game difficulty is low to a map of which game difficulty is high.

Furthermore, the deep-learning based game play service method according to an embodiment of the present disclosure may include a step S11005 of performing teacher learning of a first reinforcement learned agent model by using a training data set. More particularly, the game play server 300 may perform teacher learning of the agent model 310 which is first reinforcement-learned for the second stage map of the second size by using the training data set which is obtained using the partition stage map of the first stage map. Accordingly, the teacher-learned agent model 310 may perform a game play even for the first stage map of the first size even in the case of not partitioning the stage map. Furthermore, the game play server 300 may sequentially input the training data set in an order from a map of which game difficulty is low to a map of which game difficulty is high and may learn it more efficiently.

In addition, the deep-learning based game play service method according to an embodiment of the present disclosure may include a step S1006 of performing second reinforcement learning of the agent model which is teacher-learned for a plurality of the first stage maps. More particularly, the teacher-learned agent model may perform a game play in some degree for the first stage map having many numbers of cases, but since the agent model is not learned with a partition stage may and considering an empty space between the partition stage maps, a case may occur that the agent model does not perform an action of obtaining the highest score. Accordingly, the game play server 300 makes the agent model 310, which is available to play in the first stage map, perform the second reinforcement learning for a plurality of first stage maps one more time. The second reinforcement learning may use the RND and the PPO like the first reinforcement learning. In addition, when performing the second reinforcement learning, the game play server 300 may mix the first stage map with gaussian noise to input. In this case, learning of the agent model 310 may be more efficiently performed.

Accordingly, the method for predicting game difficulty by using a deep-learning based game play server according to an embodiment of the present disclosure may provide a game play server for which a game play is available for a new stage map which is not learned.

Figure 13:
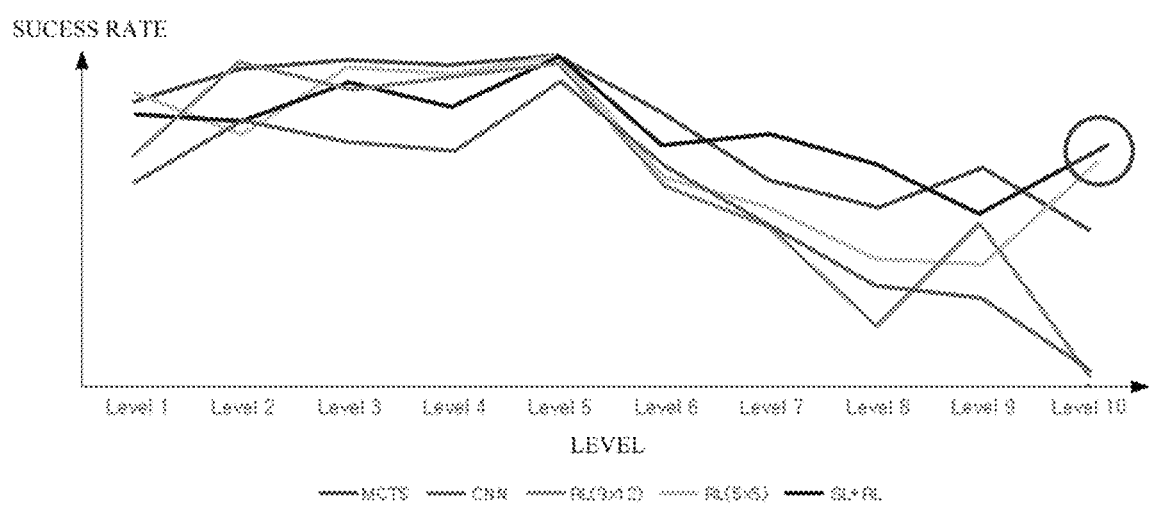
FIG. 13 illustrates a graph for comparison between an agent model of an exemplary embodiment of the present disclosure and an agent model of conventional art.

FIG. 13 illustrates a graph for comparison between an agent model of an exemplary embodiment of the present disclosure and an agent model of conventional art.

Referring to FIG. 13, the performance between the case of learning an agent model according to a deep-learning based game play service method according to the exemplary embodiment of the present disclosure and the case of learning an agent model according to the conventional art is compared. The performances of the agent models are similar for level 5 or lower in a stage map. However, there is a difference in performance in level 10 which is the highest level in the stage map. First, the success rate of the agent model learned with MCTS algorithm, CNN teacher learning and 9×12 reinforcement learning, which are learning methods according to the conventional art is abruptly decreased. However, the method of partitioning a stage map and reinforcement learning according to the exemplary embodiment of the present disclosure shows high success rate even in the stage map of level 10. Furthermore, the agent model reinforcement learned in 9×12 stage map after reinforcement learned in the partition stage map shows the highest success rate in level 10.

Figure 14:
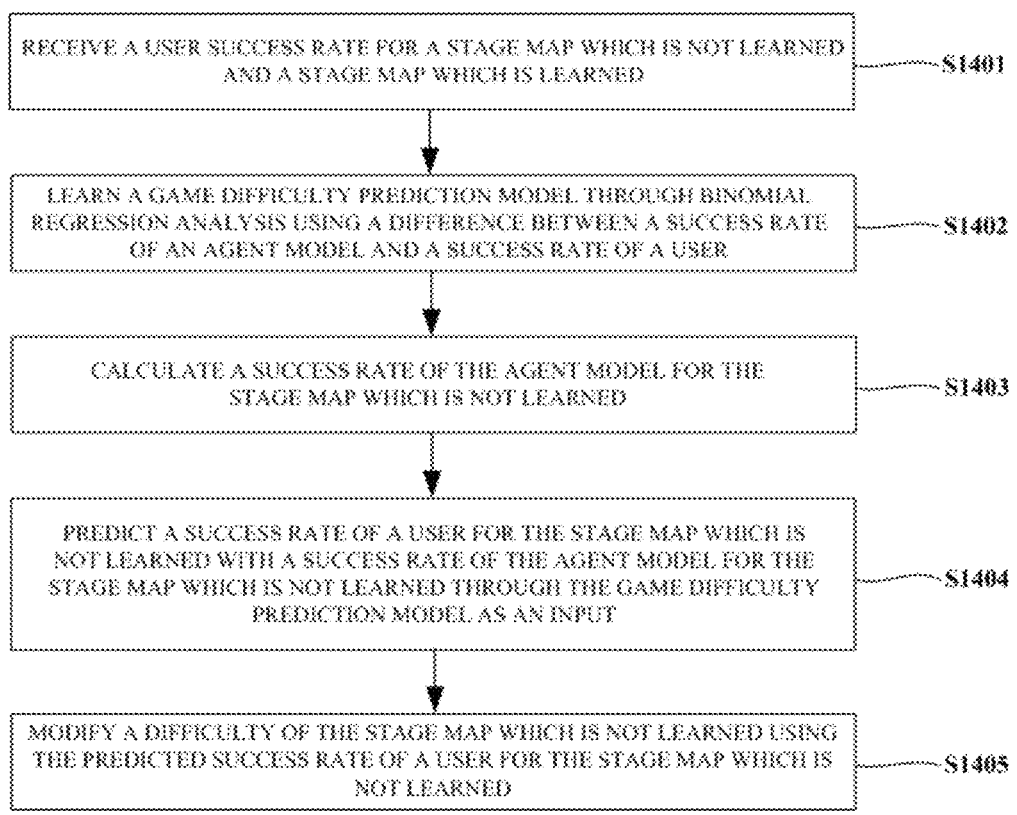
FIG. 14 is a flowchart for a method for predicting game difficulty based on deep-learning according to an embodiment of the present disclosure.

FIG. 14 is a flowchart for illustrating a method for predicting game difficulty based on deep-learning according to an embodiment of the present disclosure.

The method for predicting game difficulty based on deep-learning according to an embodiment of the present disclosure relates to a 3-match puzzle game in which a deep-learning based game difficulty prediction server performs an action of arranging a manipulation puzzle in a fixed puzzle arranged on a stage map, and when three or more puzzles of the same color are matched, the puzzles are removed and a score is obtained, and accordingly, may predict a user difficulty for a stage map which is not learned.

Referring to FIG. 14, the method for predicting game difficulty based on deep-learning according to an embodiment of the present disclosure may include a step S1401 of receiving a user success rate for a stage map which is not learned and a stage map which is learned.

In addition, the method for predicting game difficulty based on deep-learning according to an embodiment of the present disclosure may include a step S1402 of learning a game difficulty prediction model through binomial regression analysis using a difference between a success rate of an agent model and a success rate of a user. The method of learning the game difficulty prediction model 410 is described with reference to FIG. 5.

Furthermore, the method for predicting game difficulty based on deep-learning according to an embodiment of the present disclosure may include a step S1403 of calculating a success rate of the agent model for the stage map which is not learned. More particularly, the success rate of the learned agent model is a success rate the agent model 310 performs a game for the stage map which is not learned to obtain.

In addition, the method for predicting game difficulty based on deep-learning according to an embodiment of the present disclosure may include a step S1404 of predicting a success rate of a user for the stage map which is not learned with a success rate of an agent model for the stage map which is not learned through the game difficulty prediction model as an input. The method of predicting a success rate of a user is described with respect to FIG. 6.

Furthermore, the method for predicting game difficulty based on deep-learning according to an embodiment of the present disclosure may include a step S1405 of modifying a difficulty of the stage map which is not learned using the predicted success rate of a user for the stage map which is not learned. The method of modifying a difficulty of the stage map which is not learned is described with respect to FIG. 6 to FIG. 9.

Accordingly, a method for predicting game difficulty by using a deep-learning based game play server according to an embodiment of the present disclosure may predict a difficulty of a stage map and modify the stage map by using the deep-learning based game play server that performs 3-match puzzle game. In addition, a method for predicting game difficulty by using a deep-learning based game play server according to an embodiment of the present disclosure may predict a game difficulty for a new stage map. Furthermore, a method for predicting game difficulty by using a deep-learning based game play server according to an embodiment of the present disclosure may adjust a game difficulty of a stage map and induce an interest in playing a game.

Some embodiments of the present disclosure described so far may be implemented in a form of program commands to be executed by various computer elements and recorded in a storage medium which is readable by a computer. The storage medium readable by a computer may include program commands, data files, data structures, and the like separately or in combined manner. The program commands recorded in the storage medium readable by a computer may be designed specifically for the present disclosure or published and usable by a skilled person in the art of a computer software field. An example of the storage medium readable by a computer may include a magnetic medium including a hard disk, a floppy disk and a magnetic tape, an optical recording medium like CD-ROM and DVD, a magneto-optical medium like a floptical disk, and a hardware device specifically configured to store and execute program commands such as ROM, RAM, flash memory, and the like. An example of program commands include a high level language executable by a computer using an interpreter as well as a machine language such as those made by a compiler. The hardware device may be modified by one or more software modules to perform a process according to the present disclosure, and vice versa.

The specific executions described in the present disclosure are embodiments but does not limit the scope of the present disclosure in any way. For the conciseness of the specification, the conventional electronic elements, control systems, software and description of other functional aspects of the systems may be omitted. Furthermore, connection lines or connection elements between elements shown in the drawing illustrate exemplary functional connection and/or physical or circuit connections, but may be represented by various functional connections, physical connections or circuit connections which are replaceable or additional. In addition, unless there are detailed mentions such as "essential" or "important", the element may not be an essential element for operation of the present disclosure.

Although the description of the present disclosure has been described with reference to a preferred embodiment, but it will be appreciated by those skilled in the art to which the present disclosure pertains that various modifications and changes may be made from the above description within the range of the concept and technical area of the present disclosure written in the claims. Accordingly, the technical scope of the present disclosure is not limited by the contents described in the specification but determined by the claims.

DETAILED DESCRIPTION OF MAIN ELEMENTS

100: terminal
200: puzzle game server
210: agent model
300: game play server
400: game difficulty prediction server
410: game difficulty prediction model

What is claimed is:

1. A deep-learning based game play server configured to perform an action of arranging a manipulation puzzle in fixed puzzles arranged on a stage map and perform a match puzzle game in which when a predetermined number or more puzzles of a same color are arranged to be matched, the matched puzzles are removed and a score is provided, the deep-learning based game play server comprising:
    at least one communicator configured to receive a plurality of first stage maps of a first size and a plurality of second stage maps of a second size;
    a memory configured to store a deep-learning based agent model;
    at least one processor configured to perform learning of the deep-learning based agent model by reading out the deep-learning based agent model and perform the match puzzle game using the learned deep-learning based agent model, the at least one processor configured to:
    perform first reinforcement learning of the deep-learning based agent model to perform an action of obtaining the score on the plurality of second stage maps,
    generate a plurality of partition stage maps, wherein each of the plurality of partition stage maps is a part of the plurality of first stage maps with the second size, and includes one or more of the fixed puzzles,
    generate a training data set with each of the plurality of first stage maps as an input data and an action of obtaining a highest score among actions on the plurality of partition stage maps as a correct answer label, perform teacher learning of the deep-learning based agent model, performed of the first reinforcement learning, by using the training data set, and
perform second reinforcement learning of the deep-learning based agent model, performed of the teacher-learning, for the plurality of the first stage maps.

2. The deep-learning based game play server of claim 1, wherein the plurality of first stage maps and the plurality of second stage maps have game difficulties according to arrangement of the fixed puzzles, and
wherein the at least one processor is configured to perform the learning of the deep-learning based agent model by inputting in an order from a map of which game difficulty is lowest to a map of which game difficulty is highest, when the plurality of first stage maps and the plurality of second stage maps are input into the deep-learning based agent model.

3. The deep-learning based game play server of claim 1, wherein the at least one processor is configured to perform the learning of the deep-learning based agent model by additionally inputting gaussian noise to the first reinforcement learning and/or the second reinforcement learning.

4. The deep-learning based game play server of claim 1, wherein a selection order of the manipulation puzzle is determined randomly with a predetermined number of colors when the match puzzle game starts,
wherein the action includes a basic action and a switch action,
wherein the basic action is an action of changing a direction or a position of the manipulation puzzle to arrange the manipulation puzzle on the stage map, and
wherein the switch action is an action of changing an order of the manipulation puzzle.

5. The deep-learning based game play server of claim 1, wherein the manipulation puzzle has a predetermined number of colors,
wherein the action includes a preparation action and a basic action,
wherein the preparation action is an action of selecting a candidate puzzle to be used as the basic action, and
wherein the basic action is an action of changing a direction or a position of the candidate puzzle to arrange the manipulation puzzle on the stage map.

6. A deep-learning based game difficulty prediction server associated with a match puzzle game in which an action of arranging a manipulation puzzle in fixed puzzles arranged on a stage map is performed and, when a predetermined number or more puzzles of a same color are matched, the matched puzzles are removed and a score is provided to a user, and predicting a user difficulty for a stage map which is not learned, the deep-learning based game difficulty prediction server comprising:
at least one communicator configured to receive a success rate of the user for the stage map which is not learned and a success rate of the user for a stage map which is learned;
at least one memory configured to store a deep-learning based agent model, a game difficulty prediction model and a success rate of the deep-learning based agent model for the stage map which is learned; and
at least one processor configured to perform learning of the game difficulty prediction model by reading out the game difficulty prediction model and predict a game difficulty for the stage map, which is not learned, by using the learned game difficulty prediction model, wherein the at least one processor is configured to:

perform learning of the game difficulty prediction model through binomial regression analysis using a difference between the success rate of the deep-learning based agent model for the stage map which is learned and the success rate of the user for the stage map which is learned,
calculate a success rate of the deep-learning based agent model for a remaining stage map which is not learned,
predict a success rate of the user for the remaining stage map, which is not learned, by inputting the success rate of the deep-learning based agent model for the remaining stage map, which is not learned, to the game difficulty prediction model,
wherein the communicator is configured to receive a plurality of first stage maps of a first size and a plurality of second stage maps of a second size, and
wherein the at least one processor is configured to:
perform first reinforcement learning of the deep-learning based agent model to perform an action of obtaining the score on the plurality of second stage maps,
generate a plurality of partition stage maps, wherein each of the plurality of partition stage maps is a part of the plurality of first stage maps with the second size, and includes one or more of the fixed puzzles,
generate a training data set with each of the plurality of first stage maps as an input data and an action of obtaining a highest score among actions on the plurality of partition stage maps as a correct answer label,
perform teacher learning of the deep-learning based agent model, performed of the first reinforcement learning, by using the training data set, and
perform second reinforcement learning of the deep-learning based agent model, performed of the teacher-learning, for the plurality of the first stage maps.

7. The deep-learning based game difficulty prediction server of claim 6, wherein the at least one processor is configured to modify a difficulty of the stage map which is not learned using the success rate of the user for the stage map which is not learned.

8. The deep-learning based game difficulty prediction server of claim 7, wherein the at least one processor is configured to increase a difficulty of the stage map which is not learned as a stage of the stage map goes up and decrease the difficulty of the stage map at predetermined stages.

9. The deep-learning based game difficulty prediction server of claim 7, wherein the at least one processor is configured to decrease the difficulty by arranging one of the fixed puzzles on a position adjacent to another of the fixed puzzles, of which color is identical to a color of the one of the fixed puzzles, in the stage map which is not learned.

10. A deep-learning based game play service method performing an action of arranging a manipulation puzzle in fixed puzzles arranged on a stage map and performing a match puzzle game in which when a predetermine number or more puzzles of a same color are arranged to be matched, the matched puzzles are removed and a score is provided, the method performed by a deep-learning based game play server comprising:
receiving, by a communicator, a plurality of first stage maps of a first size and a plurality of second stage maps of a second size;
performing, by a processor, first reinforcement learning of the deep-learning based agent model to perform an action of obtaining the score on the plurality of second stage maps,
generating, by the processor, a plurality of partition stage maps, wherein each of the plurality of partition stage maps is a part of the plurality of first stage maps with the second size, and includes one or more of the fixed puzzles, generating, by the processor, a training data set with each of the plurality of first stage maps as an input data and an action of obtaining a highest score among actions on the plurality of partition stage maps as a correct answer label, performing, by the processor, teacher learning of the deep-learning based agent model, performed of the first reinforcement learning, by using the training data set, and performing, by the processor, second reinforcement learning of the deep-learning based agent model, performed of the teacher-learning, for the plurality of the first stage maps.

11. The deep-learning based game play service method of claim 10, wherein the plurality of first stage maps and the plurality of second stage maps have game difficulties according to arrangement of the fixed puzzles, and wherein the performing of the first reinforcement learning of the deep-learning based agent model comprises inputting in an order from a map of which game difficulty is lowest to a map of which game difficulty is highest, when the plurality of second stage maps are input into the deep-learning based agent model to perform learning of the deep-learning based agent model.

12. The deep-learning based game play service method of claim 10, wherein the plurality of first stage maps and the plurality of second stage maps have game difficulties according to arrangement of the fixed puzzles, and wherein the performing of the second reinforcement learning of the deep-learning based agent model comprises inputting in an order from a map of which game difficulty is low to a map of which game difficulty is high, when the plurality of first stage maps are input into the deep-learning based agent model to perform learning of the deep-learning based agent model.

13. The deep-learning based game play service method of claim 10, further comprising inputting gaussian noise to input of the first reinforcement learning and/or the second reinforcement learning of the deep-learning based agent model.

14. The deep-learning based game play service method of claim 10, wherein a selection order of the manipulation puzzle is determined randomly with a predetermined number of colors when the match puzzle game starts, wherein the action includes a basic action and a switch action, wherein the basic action is an action of changing a direction or a position of the manipulation puzzle to arrange the manipulation puzzle on the stage map, and wherein the switch action is an action of changing an order of the manipulation puzzle.

15. The deep-learning based game play service method of claim 10, further comprising:

performing learning of a game difficulty prediction model by reading out the game difficulty prediction model and predicting a game difficulty for a stage map, which is not learned, by using the learned game difficulty prediction model.

16. The deep-learning based game play service method of claim 15, wherein the performing of the learning of the game difficulty prediction model includes:

performing learning of the game difficulty prediction model through binomial regression analysis using a difference between a success rate of the deep-learning based agent model for a stage map which is learned and a success rate of a user for the stage map which is learned, calculating a success rate of the deep-learning based agent model for a remaining stage map which is not learned, and predicting a success rate of the user for the remaining stage map, which is not learned, by inputting the success rate of the deep-learning based agent model for the remaining stage map, which is not learned, to the game difficulty prediction model.

17. The deep-learning based game play service method of claim 16, further comprising modifying a difficulty of the stage map which is not learned using the success rate of the user for the stage map which is not learned.

18. The deep-learning based game play service method of claim 17, wherein the modifying of the difficulty of the stage map which is not learned includes increasing a difficulty of the stage map which is not learned as a stage of the stage map goes up and decreasing the difficulty of the stage map at predetermined stages.

19. The deep-learning based game play service method of claim 17, wherein the modifying of the difficulty of the stage map which is not learned includes decreasing the difficulty by arranging one of the fixed puzzles on a position adjacent to another of the fixed puzzles of which color is identical to a color of the one of the fixed puzzles, in the stage map which is not learned.

* * * * *